United States Patent [19]

Ehret

[11] Patent Number: 5,083,471

[45] Date of Patent: Jan. 28, 1992

[54] METHOD AND APPARATUS FOR CAPTURING TORQUE FOR TESTING THE RIGIDITY AND STRENGTH OF TORQUE TRANSMISSION COMPONENTS

[76] Inventor: John B. Ehret, 20860 Greenwood Dr., Olympia Fields, Ill. 60461

[21] Appl. No.: 738,202

[22] Filed: Jul. 30, 1991

Related U.S. Application Data

[63] Continuation-in-part of Ser. No. 542,582, Jun. 25, 1990, abandoned.

[51] Int. Cl.$^5$ ............................................. G01N 3/22
[52] U.S. Cl. .................................... 73/865.9; 73/847
[58] Field of Search ............... 73/862.08, 862.09, 1 C, 73/847, 848, 865.9

[56] References Cited

U.S. PATENT DOCUMENTS

| | | | |
|---|---|---|---|
| 3,740,999 | 6/1973 | Whitehouse | 73/1 C |
| 4,509,377 | 4/1985 | Mentzell et al. | 73/865.9 X |

OTHER PUBLICATIONS

Letter dated Jun. 2, 1988 from Whiting Corporation to Midwest Foundation Corporation.
Letter dated Jun. 29, 1988 from Whiting Corporation to J. S. Alberici Corporation.
Undated handwritten letter to Mr. Rost from J. B. Ehret with 2 sketches.
Whiting Corporation Drawing No. U-93190 dated Jan. 11, 1989.

*Primary Examiner*—Charles A. Ruehl
*Attorney, Agent, or Firm*—Lee, Mann, Smith, McWilliams & Sweeney

[57] ABSTRACT

A method and apparatus for capturing the torque produced by a torsional drive system for testing the rigidity and strength of the components of the torsional drive. A lock bar is connected by a coupling to the torsional output shaft of the torsional drive system such that torque from the output shaft is transferred to the lock bar in such a manner as to transmit no harmful thrust, bending or other random forces to the drive coupling or reducer. The lock bar is rigidly connected to the base of the torsional drive system but a flexible coupling can be used which permits parallel offset and/or angular misalignment between the output shaft and the lock bar. The lock bar transfers the torque to the base of the torsional drive system thereby capturing the torque within the drive system. The lock bar is provided with a passageway which allows access to the key and keyways of the output shaft and of the coupling for checking alignment of the output shaft and the lock bar, and for checking the fit of the key and the coupling while the output shaft is under any desired torsional load.

11 Claims, 5 Drawing Sheets

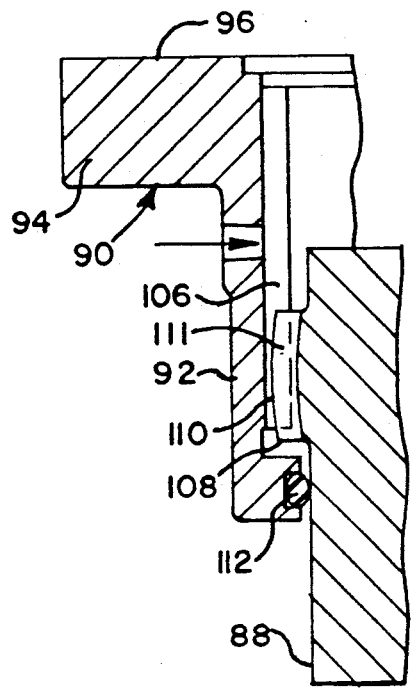
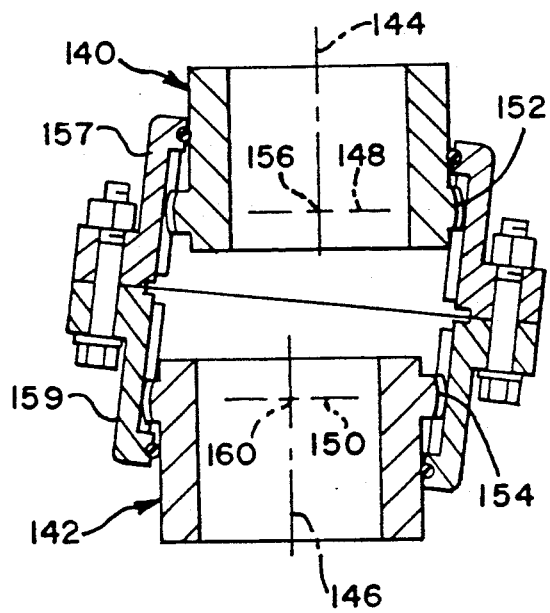
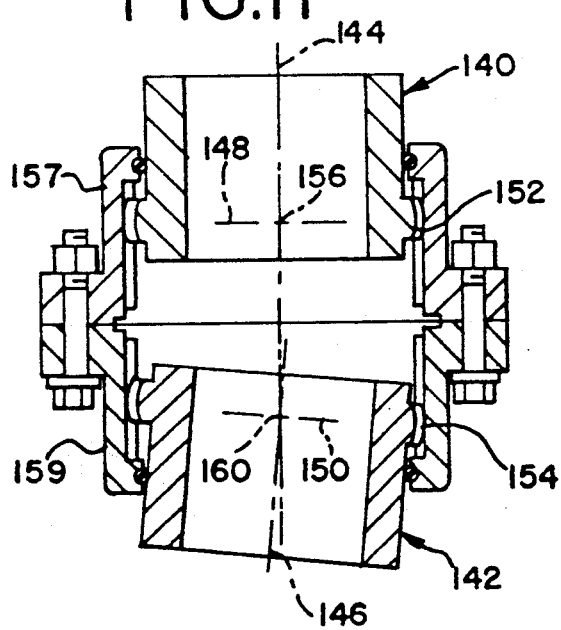
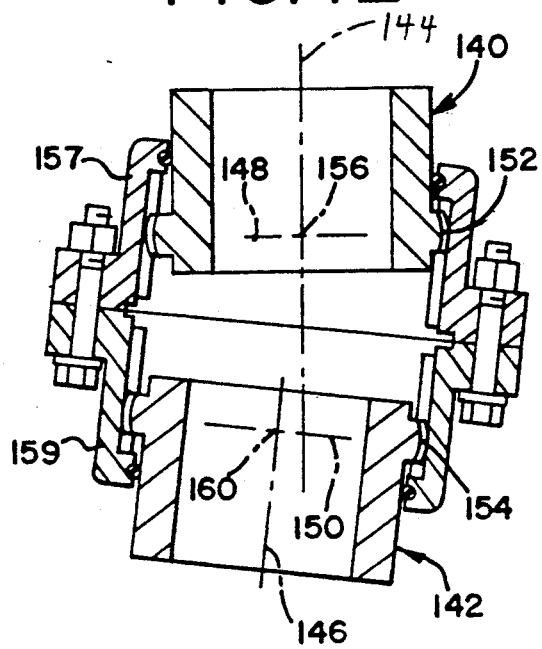

METHOD AND APPARATUS FOR CAPTURING TORQUE FOR TESTING THE RIGIDITY AND STRENGTH OF TORQUE TRANSMISSION COMPONENTS

RELATED APPLICATIONS

This application is a continuation-in-part of U.S. patent application Ser. No. 542,582 filed June 25, 1990, now abandoned.

BACKGROUND OF THE INVENTION

The present invention relates to a method of, and the apparatus for, testing the rigidity and strength of the components of a torsional drive system. More specifically the invention provides for the balanced or symmetrical capturing of the torque produced by the drive system within the drive system itself, while allowing access to the torsional output shaft and its associated coupling, keyways and key.

Torsional drive systems are used to operate a wide variety of equipment and machinery. Where torsional drive systems are required to produce large output torques, such as for the operation of drawbridges and lock gates, the continued operational reliability of the drive system is extremely important. Therefore torsional drive systems are often required to be tested prior to installation at, or above, full operational torsional loads. Such tests help to ensure that the torsional drive system is capable of producing the required torsional output without malfunctioning.

Previously, tests were conducted utilizing means such as large concrete sliding blocks to create the load torque to resist the drive system. The testing of torsional drive systems has therefore been quite expensive and very difficult to balance for pure torsion. It has therefore been found desirable to provide a method and apparatus for testing drive systems which allow the drive system to be tested at a nominal cost and with readily assureable balanced loads that do not generate harmful bending or radial forces not capable of being handled by the drive machinery.

Torsional drive systems generally include a motor, one or more reducers, and various couplings for producing a torque at an output shaft. A flexible gear coupling is usually used to transmit the torque from the output shaft to whatever is desired to be driven. The output shaft and coupling are connected with a key which fits within a keyway in the shaft and in the coupling. The fit of the key within the keyways has been found to be critical to the long operational life of the drive system. Where the key fits too loosely within the keyways, the output shaft and coupling will be subject to increased stress during operation which leads to metal fatigue, stress induced cracks, and progressive loosening.

While the fit of the key within the keyways may be measured with feeler gauges and other means prior to installation of the drive system, to obtain a realistic indication of the key's fit, measurements must be taken before, after and while the output shaft and coupling are being subjected to full operating torsional loads. It has therefore also been found desirable to conduct the above-mentioned test of the drive system in such a manner that access may be had to the key and keyways while the drive system is producing a full operating or test torsional load and to attach monitoring devices such as strain gauges or ultrasound transducers to warn of changes within the drive system.

SUMMARY OF THE INVENTION

A lock bar is provided for the balanced or symmetrical capturing of torque within a torsional drive system for testing the rigidity and strength of the components of the drive system. The lock bar includes a flange adapted to perfectly engage the coupling of the torsional drive system's output shaft. The flange is attached to a plate which is attached to the base of the drive system. When the drive system is turned on, a test torque is produced at the output shaft which is transferred to the coupling through a key and keyways in the shaft and the coupling. The coupling will transfer the test torque to the lock bar and the lock bar will transfer the test torque to the base of the drive system thereby capturing the torque within the drive system. The lock bar is provided with a passageway which allows access to the key and keyways of the output shaft and of the coupling thereby permitting the measurement of the fit of the key within the keyways and permitting other monitoring while the drive system is under the test torsional load. The passageway also allows for the measurement of the alignment between the lock bar and the output shaft.

Although the optimum design of the torsional drive system and of the lock bar would provide identical machining and finishing of the lock bar flange and of the coupling of the torsional drive output shaft so that they could readily mate and be secured together, this is not always the case. Improper machining, assembly, construction or mating of unmachined structural surfaces with machined surfaces may cause misalignment such as parallel offset or angular misalignment, or both, between the lock bar and the shaft. When this happens, the parts are twisted together, as by the tightening of coupling bolts and application of test torque, and damage may occur in the torsional drive output shaft, reducer and coupling which would adversely affect the life of the torsional drive in the field. For example, the bolt holes in the coupling may be elongated which could cause loosening of the bolts during operational use. This in turn can cause loss of lubricant followed by excessive wear. These problems are cured by the use of either one or two flexible coupling halves or the perfectly accurate (near zero misalignment-parallel, angular or both) assembly of the lock bar to the drive. Where parallel and angular misalignment exist concurrently, the misalignments must be in the same plane for a gear coupling to function properly. Compound angular misalignment is not permissible where gear couplings are used. That is where angular misalignment occurs in one plane and additional angular misalignment exists in a second plane.

DESCRIPTION OF THE DRAWINGS

FIG. 9 is a vertical sectional view of the gear teeth in the flexible shaft coupling.

FIG. 10 is a diagrammatic view showing parallel offset between two shafts.

FIG. 11 is a diagrammatic view showing angular misalignment between two shafts.

FIG. 12 is a diagrammatic view showing both parallel offset and angular misalignment between two shafts.

DESCRIPTION OF THE PREFERRED EMBODIMENTS

Figure 1:
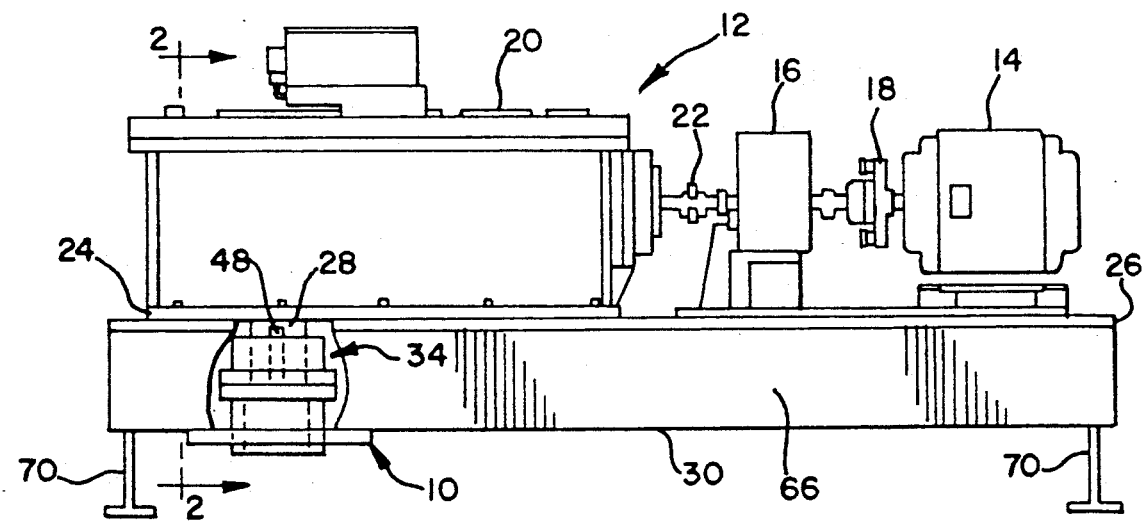
FIG. 1 is a side elevational view of a torsional drive system with the lock bar shown in place.
Figure 2:
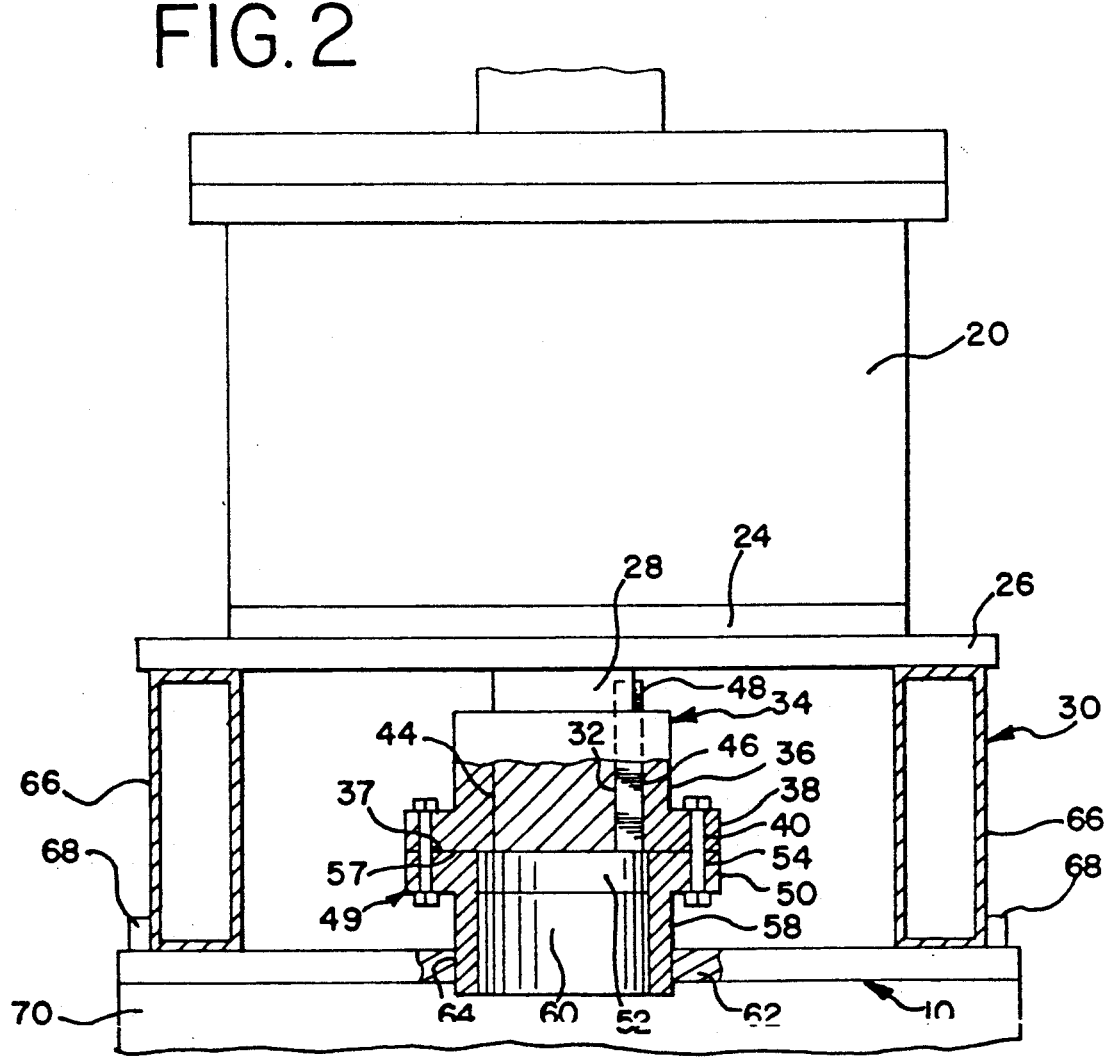
FIG. 2 is a sectional view taken along lines 2—2 of FIG. 1 showing a portion of the drive system and the lock bar broken away.
Figure 3:
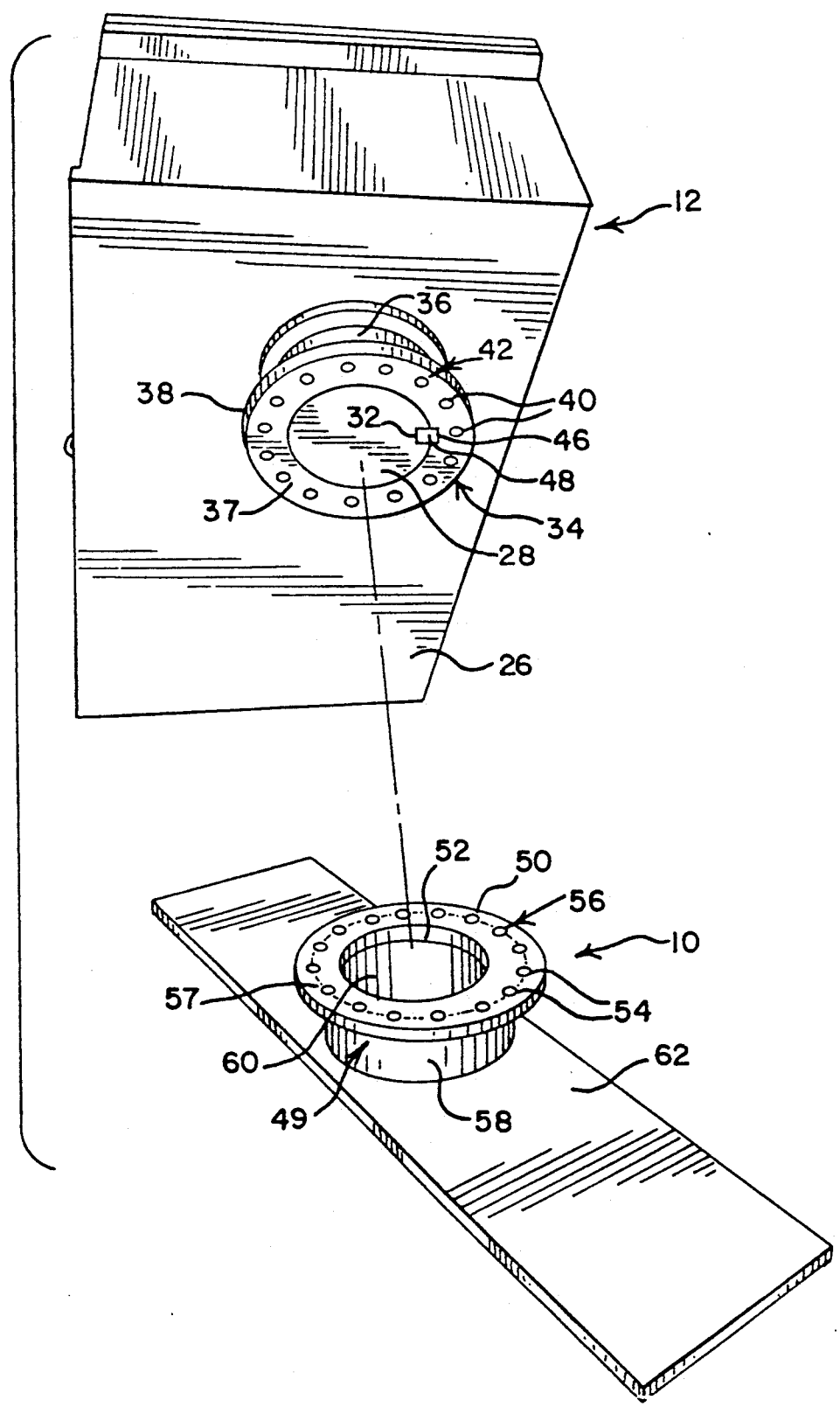
FIG. 3 is an exploded view showing the bottom of the torsional drive system and the top of the lock bar.

The lock bar 10 of the first embodiment is shown in FIG. 1 as being attached to a torsional drive system 12. The torsional drive system 12 includes a motor 14 connected to a brake 16 through a torque limiting coupling 18, and a speed reducer 20 connected to the brake 16 with a coupling 22. The reducer 20 includes a base 24 which is fastened to a baseplate 26. The brake 16 and the motor 14 are also fastened to the baseplate 26. A sub-base 30 is attached to the underside of the baseplate 26. The sub-base 30 is a rectangular tube which extends around the perimeter of the baseplate 26. A vertical output shaft 28 extends downwardly from the reducer 20 through an aperture (not shown) in the baseplate 26. As best shown in FIGS. 2 and 3, the output shaft 28 includes a keyway 32. The drive system 12 shown and described here is but one of many different possible variations and combinations of drive system components.

A rigid coupling 34 is provided for attachment to the output shaft 28. The coupling 34 includes a cylindrical stem 36 and a flange 38. The flange 38 is connected to the lower end of the stem 36 and includes a face 37 and a series of apertures 40 arranged in a bolt circle 42. A bore 44 extends through the stem 36 and the flange 38 such that the coupling 34 will fit closely around the output shaft 28. The coupling 34 includes a keyway 46. A key 48 fits within the keyway 32 of the output shaft 28 and within the keyway 46 of the coupling 34, thereby connecting the coupling 34 to the shaft 28 for the transmission of torsional forces. The coupling 34 described herein is one type of coupling which is available. Other types of couplings will be described in connection with other embodiments. Any suitable and operable coupling may be used with the present invention.

The lock bar 10 includes a rigid coupling 49. The rigid coupling 49 includes a flange 50 having a central aperture 52 and a series of circumferential apertures 54 arranged in a bolt circle 56. The flange 50 has a face 57. The bolt circle 56 in this embodiment is designed to be identical to the bolt circle 42 of the coupling 34. The central aperture 52 of the flange 50 is sized to provide complete access to the key 48 and the keyways 32 and 46. A lower cylindrical stem 58 is connected to, and extends downwardly from, the flange 50. The stem 58 includes a longitudinal bore 60 which is aligned with, and is of equal or larger diameter than, the aperture 52 in the flange 50. The lower edge of the stem 58 is attached to a plate 62. The stem 58 extends through an aperture 64 in the plate 62 such that the stem 58 may be attached, by means such as welding, to both the upper surface and lower surface of the plate 62 and such that the location of the stem 58 within the aperture 64 is adjustable prior to attachment to the plate 62. The length of the stem 58 is sized so that the top surface of the plate 62 will abut, or will be relatively close to, the bottom of the sub-base 30. The bore 60 and the apertures 52 and 64 define a passageway through the lock bar 10. As shown in FIG. 2, the plate 62 extends between, and a distance past, the legs 66 of the sub-base 30. A rectangular bar 68 is provided for attachment by welding or other suitable temporary means to each end of the plate 62.

Each of the components of the lock bar 10 must be designed to safely resist the torsional test loads and any other loads to be produced during testing. As shown, parallelism is assumed between the axis of the reducer shaft 28, the axes of the bolt hole apertures 54 of flange 50, and the axes of the bolt hole apertures 40 in flange 38; between the mating faces 37 and 57 of the flanges 38 and 50; and between the top face of lock bar 10 and the legs 66, but these are ideal conditions. If these conditions are not present, the test torque and bolt tightening will result in serious damage by twisting and bending of the drive components.

When conducting a test, the torsional drive system 12 is placed upon supports 70 a convenient distance above the floor or ground. The flange 50 of the lock bar 10 is attached to the flange 38 of the coupling 34 by fasteners which extend through the bolt circle apertures 40 and 54. The lock bar 10 is positioned so that the plate 62 is perpendicular to the legs 66 of the sub-base 30. A rectangular bar 68 is placed at each end of the plate 62 adjacent to the exterior of the sub-base leg 66. The bars 68 are welded to the plate 62 and are welded or rigidly shimmed to the legs 66 of the sub-base 30. Bracing between the legs 66 may need to be installed depending upon the size of the torsional force which is to be created during testing.

As the couplings 34 and 49 are both rigid couplings, they will not compensate for any parallel offset or angular misalignment between the lock bar 10 and the shaft 28. Any misalignment, either parallel offset or angular misalignment, of the couplings 34 and 49 will cause radial loads to be applied to the shaft 28 which can be destructive to the bearings within the gear reducer 20. The couplings 34 and 49 must therefore be attached to the shaft 28 both parallel and coaxial to the central axis of the shaft 28 to prevent any detrimental effects to the drive system 12 from the test procedure. In addition, the faces 37 and 57 of the couplings 34 and 49 should be milled flat and perpendicular to the axes of the couplings 34 and 49 so that they will mate without any gaps between the faces 37 and 57. Each of the apertures 40 and 54 should be of identical diameter and length. Each aperture 54 should be parallel and coaxial with a respective aperture 40. The flanges 38 and 50 should be of equal thickness, hardness, tensile strength and yield strength.

Once the lock bar 10 is in place, the motor 14 may be turned on to produce the desired amount of test torque at the output shaft 28. For example, it may be desirable to produce a test torque which will cause the torque limiting coupling 18 to slip. The test torque may be produced for any suitable length of time, however some electrical or mechanical overload safety device should be provided in the system. The torque which the motor 14 produces at the output shaft 28 will be transferred by the key 48 to the coupling 34. The coupling 34 will transfer the torque to the flange 50 of the lock bar 10 through the fasteners in the bolt circles 42 and 56. The flange 50 will transfer the torque to the stem 58 and to the plate 62. The bars 68 will transfer the torque from the plate 62 to the sub-base 30 wherein the torque is returned to and captured within the drive system 12. The test may be duplicated by applying the test torque in the opposite direction.

While the test torque is being produced, access may be had to the key 48 and the keyways 32 and 46 through the passageway created by the bore 60 and the apertures 52 and 64 in the lock bar 10. The fit of the key 48 within the keyways 32 and 46, and the alignment of the couplings 34 and 49, may thus be measured while the shaft 28 and the coupling 34 are under the test torsional load. Other mechanical and electrical parameters such as voltage, amperage, noise, alignment, revolutions-per-minute and coupling slip time may also be monitored and documented. Strain gages may be applied through the bore 60 for recording shaft and key loads.

The lock bar 10 may be adapted for use with various types of couplings 34 and 49 as will be described later. The lock bar 10 may also be adapted to account for variations in the distance between the mating surface of the flange 38 of the coupling 34 and the bottom surface of the sub-base 30. For example, where the mating surface of the flange 38 and the bottom surface of the sub-base 30 are in or nearly in the same plane, the bolt circle 56 could be placed in the plate 62 for directly attaching the plate 62 to the flange 38 while allowing the plate 62 to also be attached directly to the sub-base 30, thereby avoiding the need of the flange 50 and the stem 58. Where the drive system 12 does not include a sub-base 30, a suitable frame may be provided for attachment to the baseplate 26, or the reducer base 24, to provide an attachment point for the plate 62.

As previously mentioned the optimal design of the torsional drive system and the lock bar will provide identical mating of the lock bar coupling 49 to the coupling 34 and perfect alignment between the couplings 34 and 49 and the shaft 28. The testing apparatus previously described is designed to operate under such conditions. However, such conditions are not always available and the couplings may be misaligned or offset in which case the lock bar 10 and the shaft 28 are not readily joinable together and a forced joining can damage the drive system. Referring to FIGS. 10, 11 and 12 there is shown in diagrammatic fashion, parallel offset misalignment in FIG. 10, angular misalignment in FIG. 11 and both parallel offset misalignment and angular misalignment in FIG. 12.

FIGS. 10-12 show an upper hub 140 and a lower hub 142, each having a central axis 144,146 which extends perpendicularly through a plane 148,150 which extends through the teeth 152,154. The intersection of the axis 144 and the plane 148 is the center of oscillation 156 of the sleeve 157 relative to the hub 140. The intersection of the axis 146 and the plane 150 is the center of oscillation 160 of the sleeve 159 relative to the hub 142. In FIG. 10, the axes 144 and 146 are parallel to one another but are offset from one another such that they are not coaxial. In FIG. 11, the axes 144 and 146 are disposed at an angle to one another, but the axis 144 extends through the center of oscillation 160 of the hub 142 such that there is no parallel offset, only angular misalignment. In FIG. 12, the axes 144 and 146 are disposed at an angle to one another and neither axis 144 or 146 extends through the center of oscillation 156,160 of the opposite hub 140,142, such that there is both parallel offset and angular misalignment. These diagrammatic views actually exaggerate the problems but it can readily be seen that when such misalignments occur, they can cause considerable difficulty and even damage to the torsional drive system, and in particular to the reducer 20, should a forced connection be made. These problems can be overcome by using various types of couplings to join the shaft 28 and the lock bar together.

Figure 4:
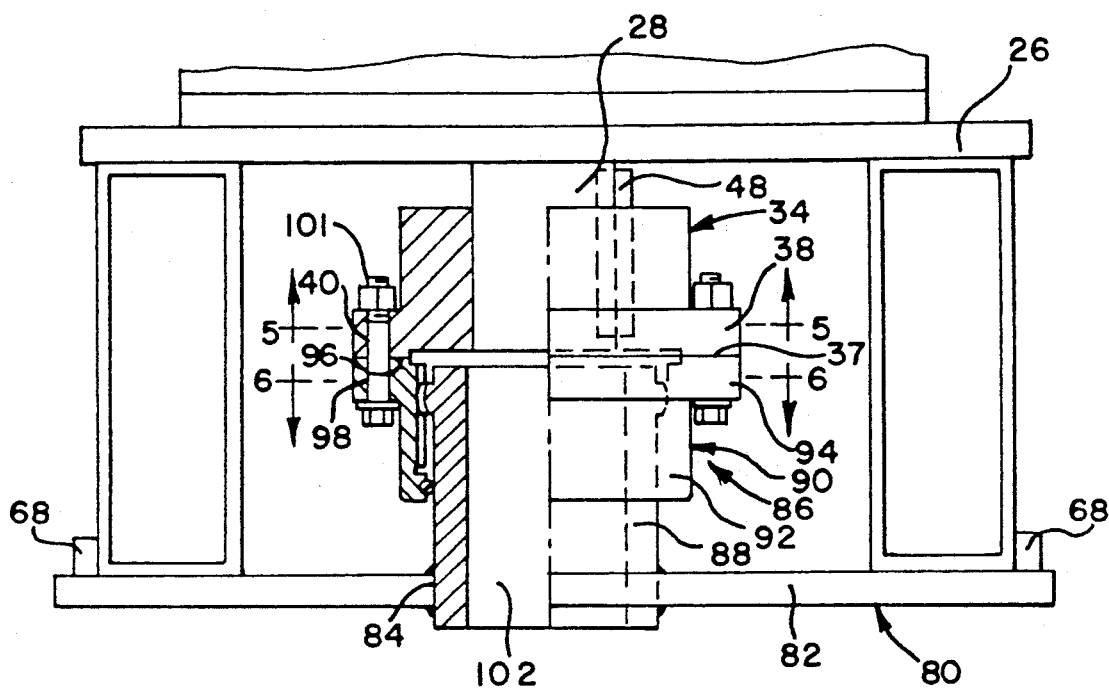
FIG. 4 is a side elevational view of another embodiment of the lock bar partially broken away to show a flexible half coupling engaging a rigid coupling on the speed reducer shaft.
Figure 5:
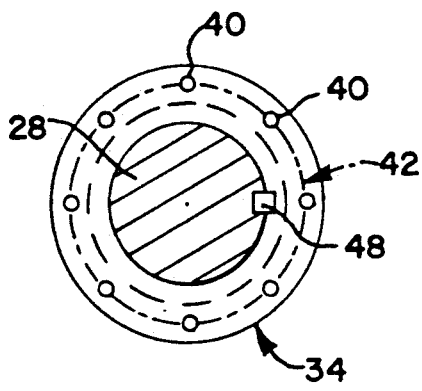
FIG. 5 is a sectional view taken along the line 5—5 of FIG. 4.

For example, in FIG. 4, there is shown a lock bar 80 which is designed to accommodate angular misalignment between the shaft 28 and the lock bar 80. The lock bar 80 includes a plate 82 having a bore 84 and a flexible coupling 86. The coupling 86 includes a flexible hub 88 and a sleeve 90. The sleeve 90 includes a stem 92 which extends around the hub 88 and a flange 94. The flange 94 includes a milled face 96 and a plurality of apertures 98 arranged in a bolt circle 100. A bore 102 extends through the hub 88 and the sleeve 90. The flange face 96 and the apertures 98 are designed to mate identically with the flange face 37 and apertures 40 of the coupling 34 as shown in FIG. 4. The flange 94 is connected to the flange 38 by fasteners 101 which should be turned and closely toleranced to fit the apertures 40,98. The fasteners 101 should be tightened to a uniform torque such that all fasteners 101 are equally torqued. The fasteners 101 should be tightened according to the coupling manufacture's suggestion.

Figure 6:
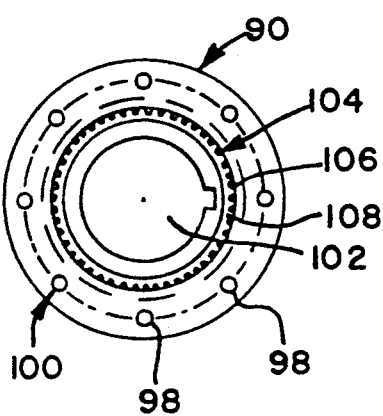
FIG. 6 is a sectional view taken along the line 6—6 of FIG. 4.

The hub 88 extends through the bore 84 and may be attached to top and bottom surfaces of the plate 82. A gearmesh 104 comprises a plurality of female teeth 106 equally spaced around the inside of the stem 92, as shown in FIGS. 6 and 9, and a plurality of male crowned teeth 108, each having a crowned tip 110 and crowned flanks 111, spaced equally around the exterior of the hub 88 so as to intermesh with the female teeth 106. The hub 88 is driven through its male teeth 108 by the female teeth 106 of the sleeve 90. As shown in FIG. 9, an O-ring 112 provides a lubricant seal between the stem 92 and the hub 88. A heavy grease is preferably hand applied to the gearmesh 104. The gearmesh 104 allows the hub 88 to move axially within the stem 92 of the sleeve 90. The crowned gear teeth 108 permit the sleeve 90 to pivot about the hub 88 to thereby accommodate angular misalignment between the shaft 28 and the lock bar 80. When the lock bar 80, having the flexible coupling 86, is used with a rigid coupling 34 as shown in FIG. 4, the shaft 28 and the lock bar 80 can be satisfactorily joined and fastened together with only some angular misalignment such that the drive system components will not be damaged during testing. The bore 102 provides access to the interior of the couplings 34 and 86 to permit measurements to be taken during testing. The position of the couplings 34 and 86 may be reversed such that the flexible coupling 86 is attached to the shaft 28 and the rigid coupling 34 is attached to the plate 82.

Figure 7:
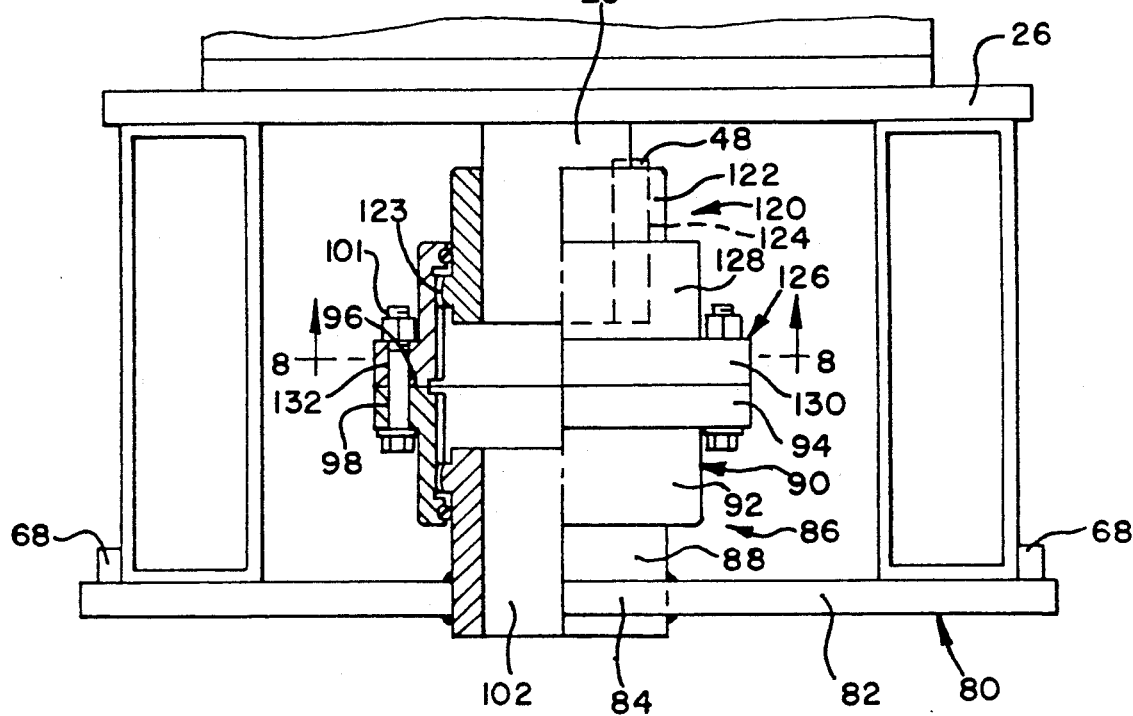
FIG. 7 is a side elevational view of yet another embodiment of the lock bar partially broken away to show another flexible shaft half coupling.
Figure 8:
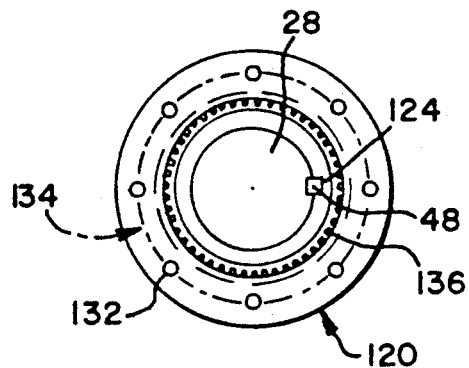
FIG. 8 is a sectional view taken along the line 8—8 in FIG. 7.

When it is desirable to accommodate either parallel offset misalignment or a combination of parallel offset misalignment and angular misalignment, the lock bar 80, having the flexible coupling 86 may be used with a flexible coupling 120 as shown in FIG. 7. The flexible coupling 120 is used in place of the rigid coupling 34. The coupling 120 is substantially identical to the coupling 86. The coupling 120 includes a hub 122 having a keyway 124 for connection to the shaft 28 by the key 48.

The coupling 120 also includes a sleeve 126 having a stem 128 and a flange 130. The flange 130 includes a plurality of apertures 132 arranged in a bolt circle 134. The apertures 132 and the bolt circle 134 are identical to the apertures 98 and bolt circle 100. The stem 128 is connected to the hub 122 by a gearmesh 136. The gearmesh 136 is similar to the gearmesh 104 and allows the sleeve 126 to move axially and to pivot about the crowned teeth 123 of the hub 122. When the lock bar 80, having the flexible coupling 86, is used with a flexible coupling 120 as shown in FIG. 7, the shaft 28 and the lock bar 80 can be satisfactorily joined and fastened together with some angular misalignment and/or some parallel offset such that the drive system components will not be damaged during testing.

The lock bar 10, having the rigid coupling 49, can also be used for connection to the flexible coupling 120. Such an arrangement would accommodate angular misalignment only between the vertical axes of the lock bar 10 and the shaft 28.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A lock bar for capturing torque transmitted by the shaft of a torque transmission component having a rigid base, said lock bar including:
   first means for removably attaching said lock bar to said shaft, said first means adapted to receive the torque transmitted by said shaft;
   second means attached to and extending from said first means, said second means being attachable to said base for transmitting the torque received by said first means to said base of said torque transmission component; and
   third means for providing access to the shaft through said lock bar.

2. The lock bar of claim 1 wherein said third means comprises a passageway extending through said first means and said second means.

3. The lock bar of claim 2 wherein said first means includes a flange.

4. The lock bar of claim 3 wherein said second means includes a plate.

5. The lock bar of claim 4 including a stem which extends between said flange and said plate.

6. The lock bar of claim 3 wherein said flange includes a bolt circle.

7. The lock bar of claim 1 wherein said first means comprises a flexible coupling adapted to accommodate misalignment between said lock bar and the shaft.

8. A method of capturing torque for testing the rigidity and strength of torque transmission components, wherein the method comprises:
   a) providing torque producing means having a rigid base for providing torque to a shaft;
   b) connecting a coupling to said shaft with connector means for transferring said torque from said shaft to said coupling;
   c) removably attaching a lock bar to said coupling and to said base, said lock bar including a passageway allowing access to said connector means, to said shaft and to said coupling while said lock bar is attached to said coupling;
   d) providing a desired amount of torque from said torque producing means to said shaft, wherein said shaft transfers said torque to said lock bar, and said lock bar transfers said torque to said base of said torque producing means; and
   e) checking the fit and alignment of said connector means, shaft and coupling.

9. The method of claim 8 wherein said connector means comprises a first keyway in said shaft, a second keyway in said coupling, and a key for insertion into said first and second keyways.

10. The method of claim 8 wherein said coupling is flexible and adapted to accommodate misalignment between said lock bar and the shaft.

11. The method of claim 8 wherein said lock bar includes a flexible coupling adapted to accommodate misalignment between said lock bar and the shaft.

* * * * *